US011913217B2

(12) United States Patent
Shumate

(10) Patent No.: US 11,913,217 B2
(45) **Date of Patent: *Feb. 27, 2024**

(54) STRUCTURES FOR USE IN ERECTING MULTISTORY BUILDINGS AND METHODS FOR MAKING SUCH STRUCTURES

(71) Applicant: Randall Engineered Wall Systems, Inc., Apopka, FL (US)

(72) Inventor: Mark Shumate, Ocoee, FL (US)

(73) Assignee: Randall Offsite Construction, Inc., Apopka, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/582,940

(22) Filed: Jan. 24, 2022

(65) Prior Publication Data

US 2022/0162847 A1 May 26, 2022

Related U.S. Application Data

(63) Continuation of application No. 16/859,563, filed on Apr. 27, 2020, now Pat. No. 11,230,837.

(51) Int. Cl.

*E04B 1/348* (2006.01)
*E04B 1/04* (2006.01)
*B28B 7/22* (2006.01)

(52) U.S. Cl.

CPC ............ *E04B 1/34823* (2013.01); *B28B 7/22* (2013.01); *E04B 1/043* (2013.01)

(58) Field of Classification Search

None

See application file for complete search history.

(56) References Cited

U.S. PATENT DOCUMENTS

| | | | | |
|---|---|---|---|---|
| 1,998,448 A * | 4/1935 | Francis | E04B 2/58 | 174/505 |
| 3,530,626 A * | 9/1970 | Istvan | E04B 1/04 | 52/236.7 |
| 3,800,493 A * | 4/1974 | Livingston | E04B 1/34869 | 52/745.03 |
| 3,991,528 A * | 11/1976 | Dillon | B66B 11/0005 | 52/79.14 |
| 4,095,380 A * | 6/1978 | Dillon | E04B 1/161 | 52/79.11 |

(Continued)

FOREIGN PATENT DOCUMENTS

KR 0171873 B1 * 2/1999

*Primary Examiner* — Joshua K Ihezie

(74) *Attorney, Agent, or Firm* — GrayRobinson, P.A.; Michael J. Colitz, III

(57) ABSTRACT

Disclosed are various construction techniques for erecting a multistory building with an elevator shaft. In accordance with the method, upper and lower shaft components are formed at an offsite facility. These shaft components are then joined together to form a segment of the larger elevator shaft. Once constructed, the segment is transported to a jobsite and erected. Once an individual segment is installed, a floor slab can be formed about the segment. Using pre-cast elevator segments simplifies and expedites the construction process. In one embodiment, each segment includes a serrated edge that facilitates a connection between the floor slab and the shaft segment. Rebar and reinforcing dowels can also be used to improve the connection. Associated shaft constructions are also disclosed.

4 Claims, 5 Drawing Sheets

(56) References Cited

U.S. PATENT DOCUMENTS

| | | | | |
|---|---|---|---|---|
| 4,231,148 | A * | 11/1980 | Harding ................ E04F 17/005 | |
| | | | 29/469 | |
| 4,565,043 | A * | 1/1986 | Mazzarese .............. E04C 1/392 | |
| | | | 52/603 | |
| 4,986,040 | A | 1/1991 | Prewer et al. | |
| 5,081,805 | A * | 1/1992 | Jazzar ................. E04B 1/34823 | |
| | | | 52/79.14 | |
| 9,249,566 | B2 * | 2/2016 | Eggleston ................. E04B 1/16 | |
| 9,371,648 | B1 * | 6/2016 | Tikhovskiy ............. E04B 5/046 | |
| 9,850,653 | B1 * | 12/2017 | Gerard .................. E04F 17/005 | |
| 11,230,837 | B2 * | 1/2022 | Shumate ................... B28B 7/22 | |
| 2004/0134152 | A1 * | 7/2004 | Powell ...................... E04B 1/20 | |
| | | | 52/561 | |
| 2008/0134616 | A1 * | 6/2008 | Craven ..................... E04B 2/18 | |
| | | | 52/606 | |
| 2009/0249714 | A1 * | 10/2009 | Combs ................... E04F 11/116 | |
| | | | 52/190 | |
| 2012/0168263 | A1 * | 7/2012 | Alois .................... B66B 19/002 | |
| | | | 52/745.03 | |
| 2014/0298745 | A1 * | 10/2014 | Rechenmacher ....... E04H 1/005 | |
| | | | 52/425 | |

* cited by examiner

STRUCTURES FOR USE IN ERECTING MULTISTORY BUILDINGS AND METHODS FOR MAKING SUCH STRUCTURES

CROSS REFERENCE TO RELATED APPLICATIONS

This application claims priority to, and is a continuation of, application Ser. No. 16/859,563 filed on Apr. 27, 2020 and entitled "Structures for Use in Erecting Multistory Buildings and Methods for Making Such Structures," now U.S. Pat. No. 11,230,837 issued Jan. 25, 2022, the contents of which is fully incorporated herein for all purposes.

BACKGROUND OF THE INVENTION

Field of the Invention

The present disclosure relates to structures for use in erecting multistory buildings. More particularly, the present disclosure relates to a modular elevator shafts and associated assembly techniques.

Description of the Background Art

Elevator shafts are a critical component of any multistory building project. However, elevator shafts are time consuming and expensive to build, requiring heavy labor to be repeated for each floor of the building. At each floor, a rebar cage must be assembled and secured in place. A crane is, thereafter, used to install formwork around the rebar cage. Concrete must then be poured into the formwork, often with the use of a boom pump. The poured concrete requires several days to cure. Once dried, a crane is again used to remove the formwork. Only after all these steps have been carried out, can the surrounding floor slab be formed. Once the floor slab has sufficiently cured, the process is then repeated for the next floor, and so on. It is for this reason that elevator shafts have a large impact on project schedules and are often the limiting factor in meeting project deadlines.

Over the years, several efforts have been made to improve upon existing elevator building techniques. One such example is disclosed in U.S. Pat. No. 3,991,528 to Dillon. Dillon discloses a modular elevator system that is designed to be installed in a multi-story building. It employs precast concrete modules defining a combined elevator shaft and utility chase area that is one story high. The modules can be stacked on top of each other to result is a completely finished elevator shaft and utility chase.

Another example is disclosed in U.S. Pat. No. 4,095,380 to Dillon. Dillon discloses a building and elevator modules. The elevator modules are precast components with opposing front and rear walls and opposing side walls, each having a at least one through vertical void therein. The end walls have locating notches disposed in the bottom edges thereof. Some of the other precast components include full and partial thickness floor slabs. The location notches in the bottom edges of the elevator modules are capable of engaging with and being supported on adjacent full thickness floor slabs. Still yet another example is found in U.S. Pat. No. 4,986,040 to Prewer. Prewer also discloses a modular elevator shaft. The prefabricated elevator shaft includes a stack of self-supporting prefabricated shaft modules whereby upper shaft modules are supported on lower modules.

Although the various systems of the background art each achieve their own unique objectives, all suffer from drawbacks. Namely, the background art fails to disclose constructions and methods that allow for the rapid installation of an elevator shaft at a jobsite and that further allows the shafts to be constructed prior to the surrounding floors. The structures and methods of the present disclosure are aimed at overcoming these and other deficiencies present in the background art.

SUMMARY OF THE INVENTION

The disclosed construction methods provide an advantage by allowing an elevator shaft to be rapidly assembled at a jobsite prior to any floors being constructed.

Another advantage is that the disclosed construction allows for an elevator shaft to be made in a series of segments, all of which can be formed and assembled at a location that is remote from the jobsite.

A further advantage of the present construction is that it allows for floor slabs to be formed about a fully assembled elevator shaft.

Still yet another advantage of the present method is that it allows for an improved connection between the elevator shaft and the surrounding floor slab.

Another advantage is that the form work and reinforcing cages typically associated with elevator shafts no longer have to assembled on the jobsite.

These and other objectives are achieved by providing an elevator shaft for use in constructing a multi-story building, with the elevator shaft being formed from a series of elevator shaft segments. Each segment includes a lower shaft component with walls, upper and lower edges, and a series of pockets. Each pocket includes a recessed surface and adjacent exposed surfaces. The elevator shaft segment further includes an upper shaft component with walls, and upper/lower edges. Each segment is formed by joining the lower edge of the upper shaft component to the upper edge of the lower shaft component. A slab floor is formed about the elevator shaft segment with the slab floor extending into the pockets of the lower shaft component.

Various embodiments of the invention may have none, some, or all of these advantages. Other technical advantages of the present invention will be readily apparent to one skilled in the art.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

The present disclosure relates to a construction method for erecting an elevator shaft for a multistory building. In accordance with the method, upper and lower shaft components are formed at an offsite facility. These shaft components are then joined together to form a segment of the larger elevator shaft. Once constructed, the segment is transported to a jobsite and erected. Once an individual segment is installed, a floor slab can be formed about the segment. Using pre-cast elevator segments simplifies and expedites the construction process. In one embodiment, each segment includes a serrated edge that facilitates a connection between the floor slab and the shaft segment. Rebar and reinforcing dowels can also be used to improve the connection. Associated shaft constructions are also disclosed. The various components of the present disclosure, and the manner in which they interrelate, are described in greater detail hereinafter.

Figure 1:
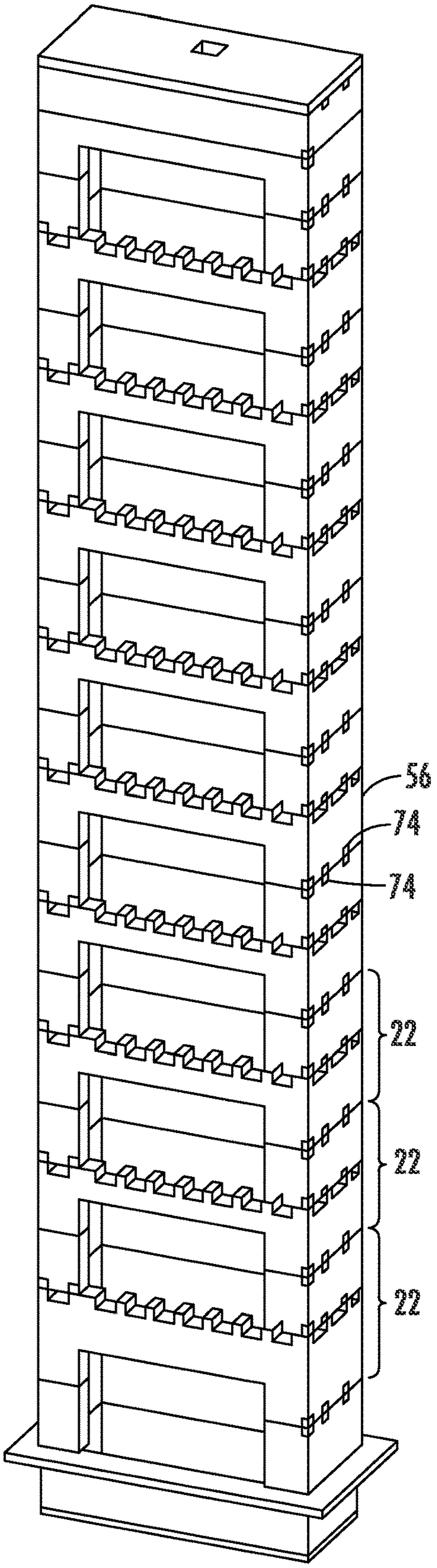
FIG. 1 is a perspective view of a completed elevator shaft.

With reference now to FIG. 1, the modular, pre-cast elevator shaft 20 of the present disclosure is illustrated. This figure illustrates a fully assembled shaft 20 with the associated floors removed for clarity. Shaft 20 is designed for a nine story building; however, the disclosed methods can be used in building with any number of floors and the depicted shaft is merely representative. As noted, completed shaft 20 is made up of a series of interconnected, smaller shaft segments 22, with each shaft segment 22 being stacked upon a lower shaft segment 22. Each segment 22 is associated with a floor of the building.

Each segment 22 is formed from interconnected upper and lower components (24 and 26). In particular, and as better illustrated in FIG. 4, a lower shaft component 26 is connected to the underside of an upper shaft component 24. A floor slab 28 is formed after the associated segment 22 is installed at the jobsite, with the slab 28 surrounding and enveloping the segment 22. As described more fully hereinafter, the lower component 26 is positioned immediately below a slab floor 28, and the upper shaft component 24 is positioned immediately above slab floor 28.

Figure 4:
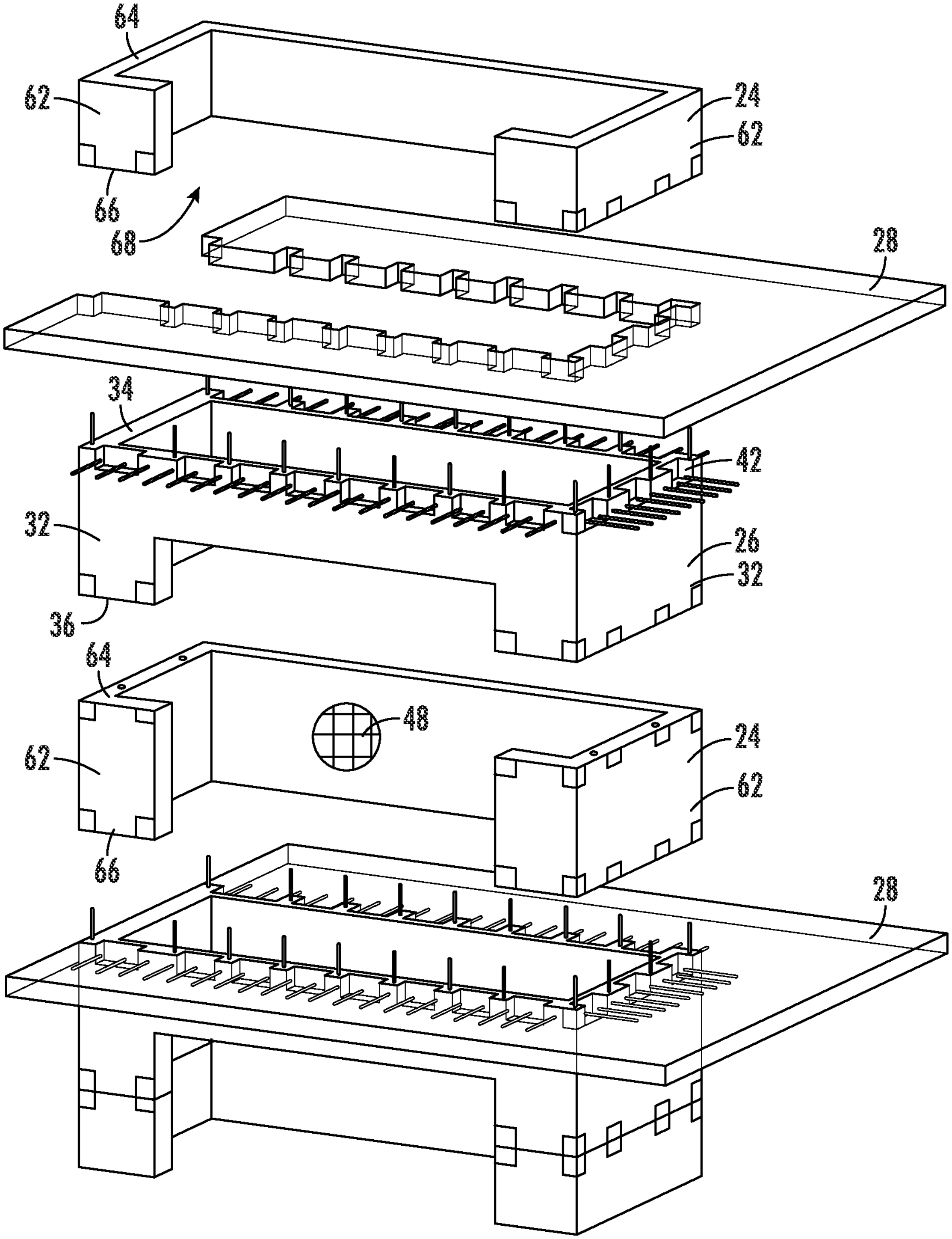
FIG. 4 is an exploded, detailed view of the elevator shaft of the present disclosure.
Figure 5:
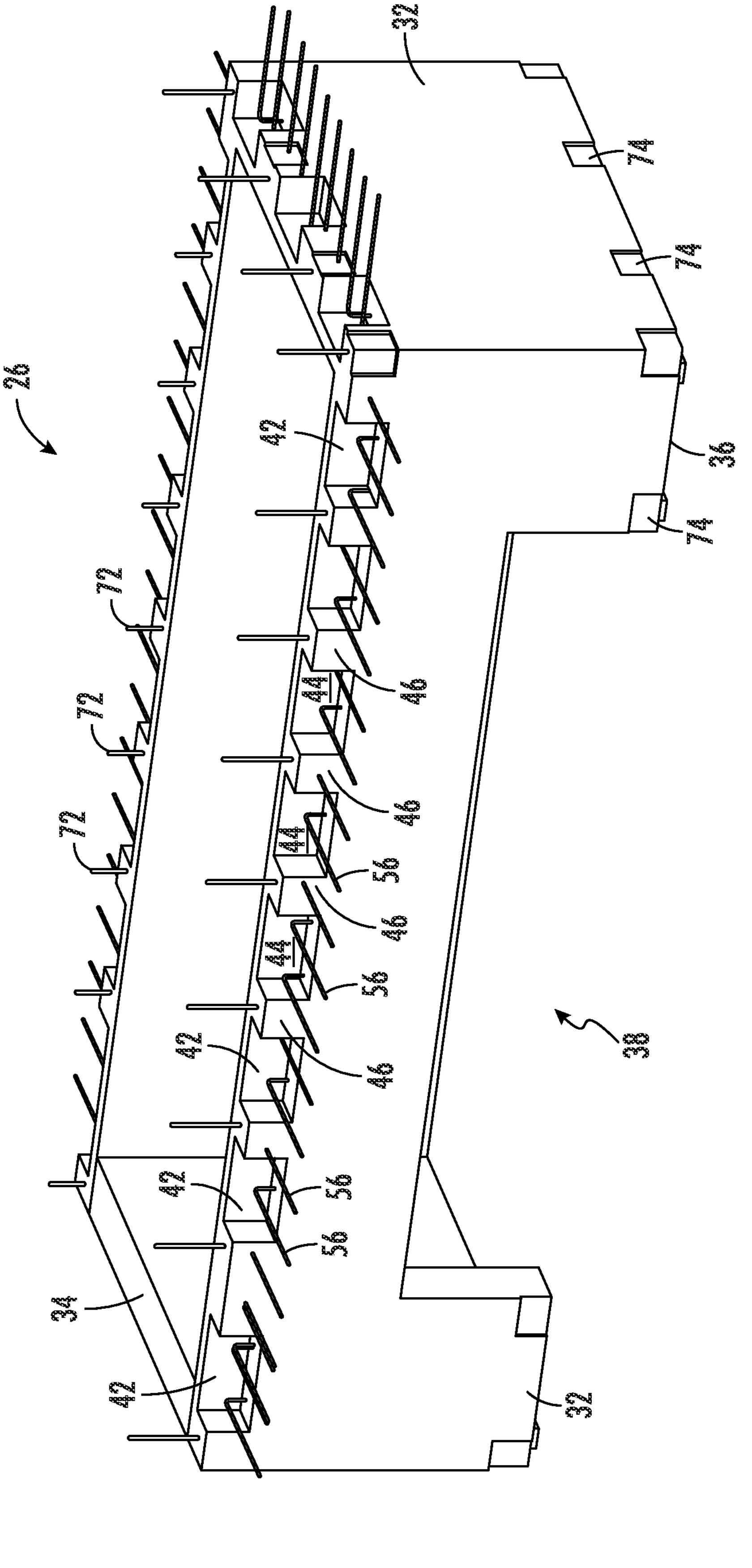
FIG. 5 is a detailed view of the lower elevator shaft component of the present disclosure.

The lower shaft component 26, depicted in FIG. 4, is rectangular in shape with four walls 32 and upper and lower edges (34 and 36). Although most shafts 28 are rectangular in shape, the use of other shapes is within the scope of the present disclosure. An opening 38 (FIG. 5) is preferably formed within one of the walls 32 of lower component 26. This opening 38 mates with a corresponding opening in the upper component 24 to accommodate one or more elevator doors. With reference now to FIG. 5, it can be seen that a series of pockets 42 are formed within lower component 26. Specifically, a serrated surface is formed adjacent the upper edge 34 of lower component 26. This serrated surface is formed by the series of equally spaced pockets 42, with each pocket 42 including a recessed surface 44 and adjacent exposed surfaces 46. In the preferred embodiment, the entire lower component 26 is formed from a reinforced concrete and includes rebar positioned within its interior. Lower component 26 is also pre-formed, meaning that it is constructed at a location remote from the jobsite.

With continuing reference to FIG. 5, a series of hooked rebar segments 52 are depicted. Each of these segments 52 is positioned within the lower component 26 as it is being formed. More specifically, each hooked rebar segment 52 includes a first end 54 that is formed within the body of lower component 26 and a second end 56 that extends outwardly from the outer face of lower component 26. In the preferred embodiment, second ends 56 extend outwardly from both the recessed and exposed surfaces (44 and 46) of the pocket 42. As more fully depicted in FIG. 2, these second ends 56 are positioned within floor slab 28 as it is formed and serve to bond floor slab 28 to the associated shaft segment 22.

Each upper shaft component 24 is formed to match the dimensions of the lower shaft component 26. As such, the depicted upper shaft component 24 includes four walls 62 and upper and lower edges (64 and 66). An opening 68 is also formed within one of the walls 62 and is designed to complement the corresponding opening 38 in the lower shaft component 26. Together, these openings (38 and 68) form a larger opening for doors of the elevator shaft. The upper, rectangular shaft component 24 is similarly pre-formed from a reinforced concrete with interior rebar 48 (FIG. 4).

Each elevator shaft segment 22 is formed by joining the upper edge 34 of the lower shaft component 26 to the lower edge 66 of the upper shaft component 24. Reinforcing dowels 72 can extend between the upper and lower shaft components (24 and 26) to improve the bonding. The connection is further strengthened via a series of stitch plates 74. Each stitch plate 74 includes an upper extent that is connected to one of the walls 62 of the upper shaft component 24 and a lower extent connected to one of the exposed surfaces 46 of the lower shaft component 26.

Figure 2:
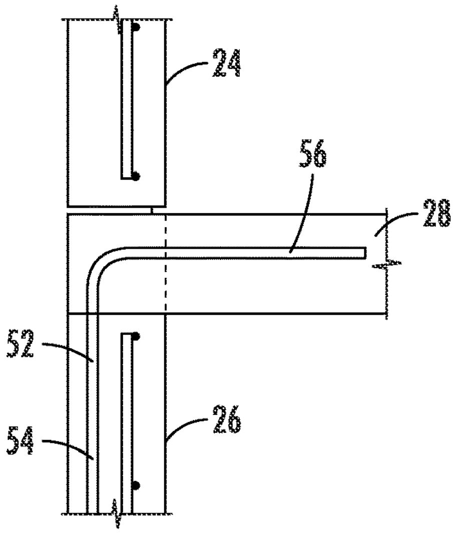
FIG. 2 is a detailed view showing the interconnection between the upper and lower shaft components and an associated floor slab.
Figure 3:
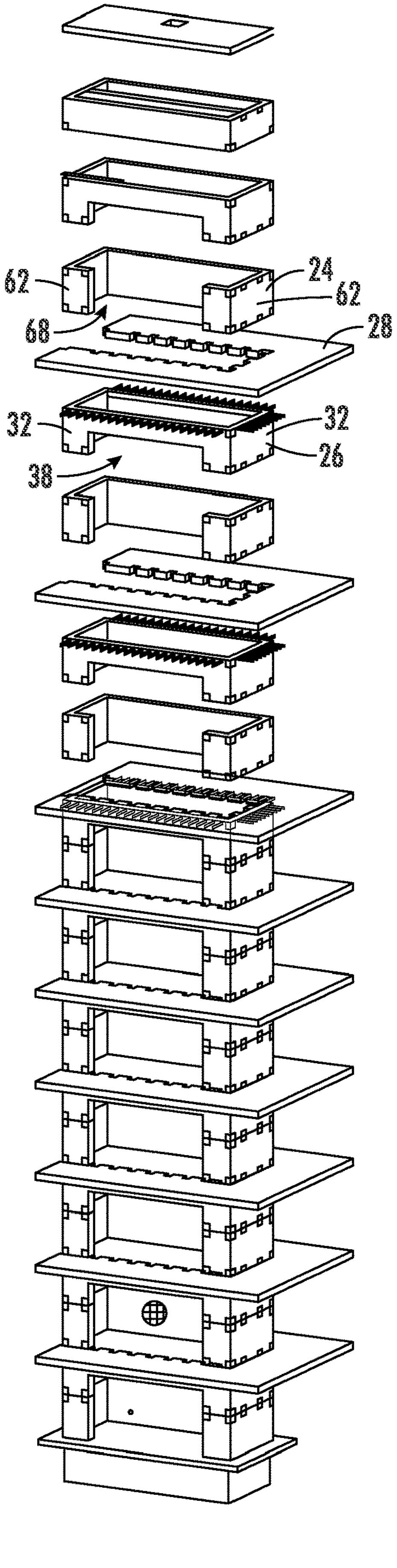
FIG. 3 is an exploded view of the elevator shaft of the present disclosure.

Once an elevator shaft segment 22 is completed it is transported to a jobsite to be erected as part of the larger elevator shaft 20. Thereafter, a slab floor 28 is formed about the shaft segment 22. As the floor slab 28 is poured, the concrete extends into and bonds with the pockets 42 of the lower shaft component 26, with the second ends 56 of the hooked rebar segments 52 extending into the slab floor 28 (FIG. 2).

Figure 6:
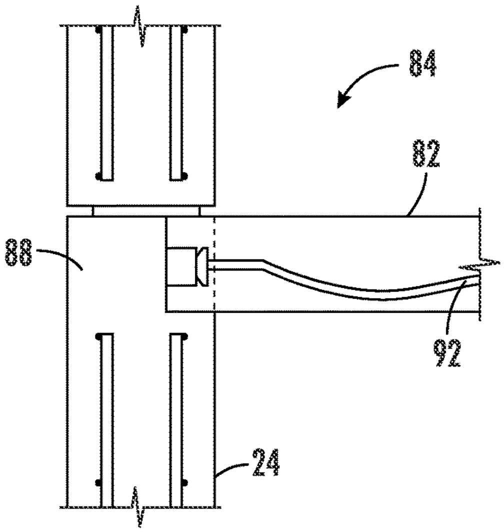
FIG. 6 is a view of the stressing end of a post tensioned slab.
Figure 7:
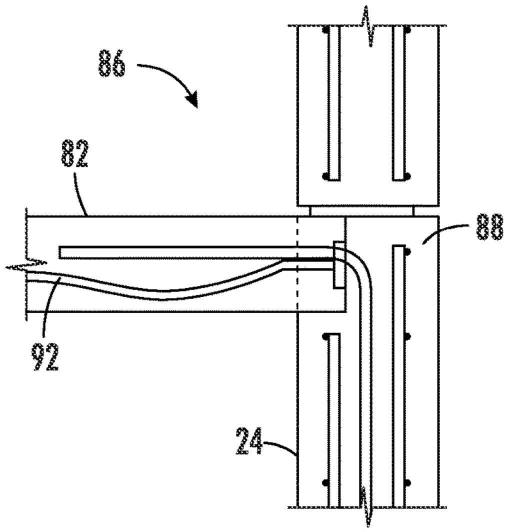
FIG. 7 is a view of the dead end of a post tensioned slab.
Figure 8:
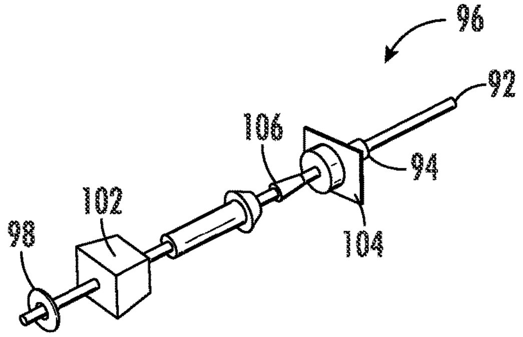
FIG. 8 is a view of a stressing anchorage used for a post tensioned slab.

The floor slab 28 can be constructed via any number of construction methods. For example, in order to provide proper reinforcement, slab 28 can be poured about rebar or rebar cages. FIGS. 6-8 illustrate a post tensioning anchorage that can be used in constructing a post tensioned slab 82. This post tensioning is achieved between opposing ends of a lower shaft component 24. More specifically, each lower shaft component includes a series of vertical corbels 88 that are monolithic with the lower portion of the shaft component 24. Post tensioning is achieved via a tendon 92 that is anchored between opposite corbels 88, with one of the corbels serving as a stressing end 84 (FIG. 6) and an opposite corbel serving as a dead end 86 (FIG. 7). Tendon 92, which can be formed from a monostrand or braided filament, is positioned within an outer sleeve 94. A series of post tensioned tendons 92 can be used within a single slab 82.

The anchorage assembly 96 used for tendon 92 is illustrated in FIG. 8. Tendon 92 is anchored at the stressing end 84 via an installation nut 98 and a recess former 102. At the opposite end, tendon 92 is anchored via an anchor body 104 and a wedge 106. In use, tendon 92 and the outer sleeve 94 are anchored at the dead end 86 via anchor body 104 and wedge 106. The opposite end of tendon 92 ends out from the opposite corbel 88 and is exposed. After slab 82 is poured, the exposed ends of tendon 92 can be tensioned, with sleeve 94 permitting tendon 92 to slide within slab 82. After a sufficient amount of tension is applied, the exposed end of tendon 92 is anchored to the stressing end 84.

The associated method of the present disclosure is next described. In the first step, a lower shaft component is formed from reinforced concrete at an offsite facility. As noted, this lower shaft component includes walls, upper and lower edges, and a series of pockets. Each pocket includes recessed and exposed surfaces. An upper shaft component is likewise formed from reinforced concrete at the offsite facility. This upper shaft component is similarly defined by walls, and upper and lower edges. In the next step, the lower edge of the upper shaft component is joined to the upper edge of the lower shaft component. The joined shaft components together constitute a shaft segment. Next, the shaft segment is further secured with a series of stitch plates, with each stitch plate connecting the wall of the upper shaft component to one of the exposed surfaces of the lower shaft component. The assembled shaft segment is then transported to the jobsite and installed. This process is repeated as needed to complete the entire elevator shaft. Thereafter, the floors can be constructed by pouring concrete about each shaft segment. As each floor is poured, the concrete extends into and bonds with the series of pockets within the lower shaft component. The floors can be poured following the completion of the entire elevator shaft. Alternatively, each floor can be poured after each individual shaft segment is installed. Furthermore, the shaft segments can be transported to the jobsite individually or in larger quantities.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

The invention claimed is:

1. An elevator shaft for use in constructing a multi-story building, the elevator shaft being formed from a series of elevator shaft segments, each of the elevator shaft segments comprising:

a lower shaft component including four walls, each wall including an upper edge and a lower edge, the upper edge of three of the four walls being serrated, with the serrations created via pockets formed within the walls, each pocket including recessed and adjacent surfaces;

an upper shaft component including four walls, with each wall including an upper edge and a lower edge, the lower edges of the upper shaft component being joined to the upper edges of the lower shaft component to form one of the series of elevator shaft segments;

a slab formed about the elevator shaft segment with the slab extending into the serrations and adhering to the associated recessed and adjacent surfaces to thereby bond the slab to the elevator shaft segment;

a series of rebar segments, each rebar segment including first and second ends, with the first end formed within the lower shaft component and the second end extending from one of the series of pockets and into the slab floor.

2. The elevator shaft as described in Claim 1 wherein the rebar segments are bent.

3. The elevator shaft as described in Claim 1 wherein the rebar segments are bent at an angle of approximately 90 degrees.

4. The elevator shaft segment as described in claim 1 wherein the lower shaft component is pre-formed.

* * * * *